United States Patent [19]

Martin

[11] Patent Number: 4,575,640

[45] Date of Patent: Mar. 11, 1986

[54] POWER CIRCUIT CONTROL APPARATUS FOR PRIMARY AND AUXILIARY LOADS

[75] Inventor: Hugh H. Martin, North Syracuse, N.Y.

[73] Assignee: General Electric Company, Portsmouth, Va.

[21] Appl. No.: 660,136

[22] Filed: Oct. 12, 1984

[51] Int. Cl.⁴ ............................................. H02J 1/10
[52] U.S. Cl. ..................................... 307/23; 307/39; 307/66; 307/86; 307/130; 307/140
[58] Field of Search ................ 307/18, 22, 23, 38, 307/39, 64, 66, 80, 85, 86, 130, 140; 455/343, 127

[56] References Cited

U.S. PATENT DOCUMENTS

| | | | |
|---|---|---|---|
| 3,562,555 | 2/1971 | Ahrons | 307/238 |
| 4,054,802 | 10/1977 | Mock | 307/38 |
| 4,327,298 | 4/1982 | Burgin | 307/66 |
| 4,375,701 | 3/1983 | Hanson | 455/343 |
| 4,486,759 | 12/1984 | Toyomura | 307/66 X |

*Primary Examiner*—Harry E. Moose, Jr.
*Assistant Examiner*—Derek S. Jennings

[57] ABSTRACT

A consumer electronics product such as a portable radio or combination radio/tape recorder having both primary and auxiliary loads is provided with power control apparatus for energizing both loads when connected to a source of a-c potential and energizing only the primary load when connected to a source of d-c potential. The control apparatus includes a solid state switching device in series with the auxiliary load, the switching device coupled to the output of the a-c source such that it is conductive only when a-c electric power is being supplied to drive the loads.

15 Claims, 4 Drawing Figures

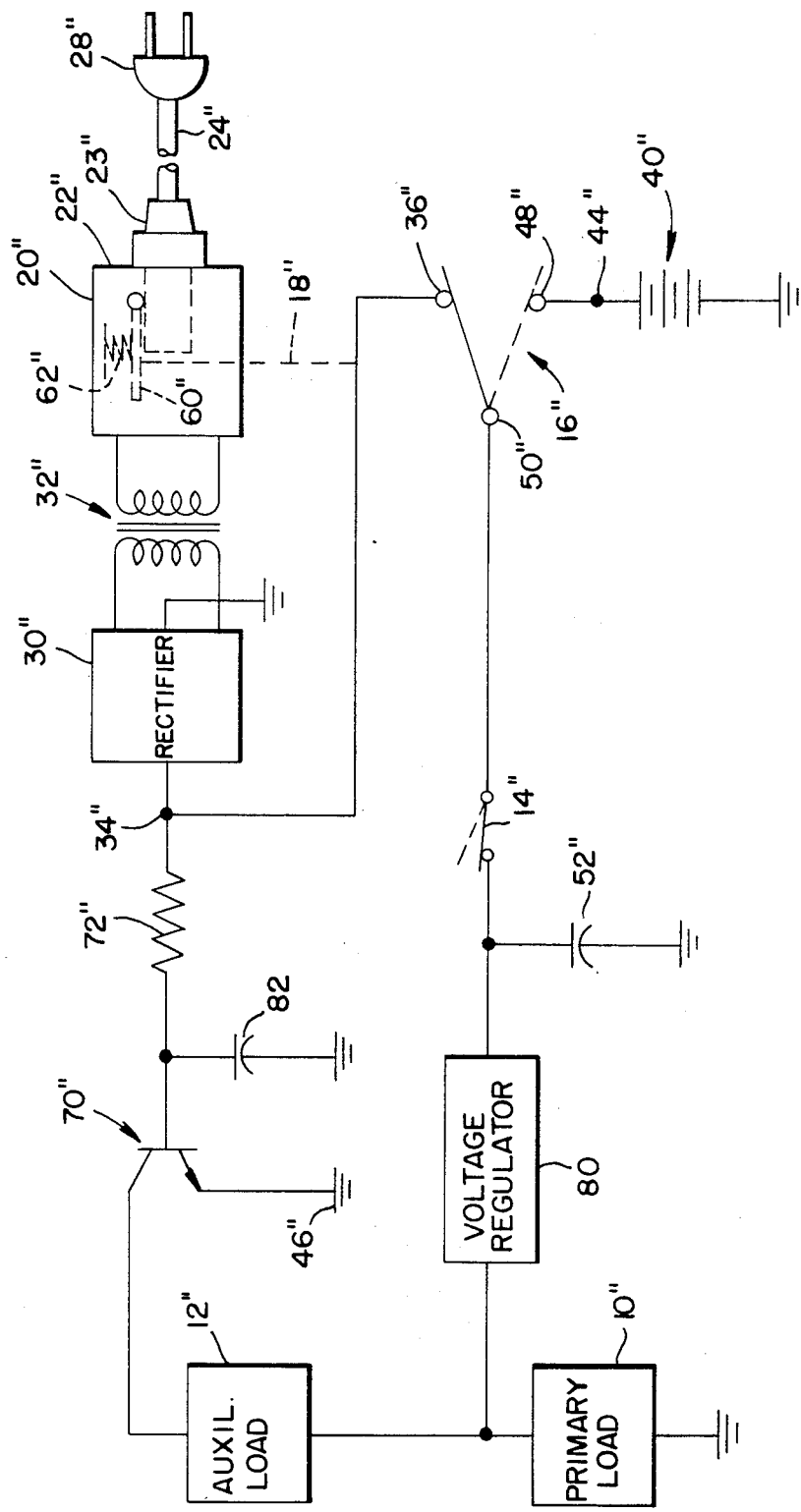

POWER CIRCUIT CONTROL APPARATUS FOR PRIMARY AND AUXILIARY LOADS

BACKGROUND OF THE INVENTION

1. Field of the Invention

This invention relates to power circuit control apparatus for primary and auxiliary loads of consumer electronics products and, more particularly, to power circuit control apparatus for energizing both loads when connected to a source of a-c potential and only the primary load when connected to a source of d-c potential.

2. Description of the Prior Art

In consumer electronics products such as portable radios and combination radio/tape recorders, it is common to provide means for permitting the product to be powered optionally by either a-c electric power from the house wiring or d-c electric power from a battery. Such consumer electronics products typically include a primary load consisting of the load elements which must be energized for product operation, such as radio receiver circuits, speaker drive circuits, and tape drive circuits. In addition, many such products include an auxiliary load consisting of one or more load elements not essential to product operation. Such load elements might include level meters and various lighting circuits for providing radio dial illumination, power on indication, and level meter illumination. In a full featured audio electronics product, the electric current required to drive the various load elements of the auxiliary load may be substantially greater than that required to drive the essential element of the primary load. In such a case, operation in the battery mode may not be entirely satisfactory due to excessive current demands, resulting in severely curtailed battery life and unacceptable operating cost.

One solution to this problem is to provide switching apparatus for connecting both the primary load and the auxiliary load to an a-c source and for connecting only the primary load to a d-c source. In this manner, all of the advantages provided by the auxiliary load elements can be enjoyed when essentially unlimited a-c electric power is available while providing reasonable life and economy when operating on battery power. In the prior art, such switching can be conveniently provided by means of multiple pole switches. Unfortunately, the initial cost of such switches tends to be relatively high, and they require extensive and expensive wiring during the manufacturing process.

SUMMARY OF THE INVENTION

It is a primary object of this invention to provide a consumer electronics product in which both the primary and auxiliary loads are energized in the a-c operating mode, but only the auxiliary load is energized in the d-c operating mode.

Another object of the invention is to provide power circuit control apparatus for providing the aforesaid function in a low cost and reliable manner.

Yet another object is to provide the aforesaid function without the use of multiple pole switches.

Briefly stated, in carrying out the invention in one form, a consumer electronics product adapted for energization from either a source of a-c potential or a source of d-c potential is provided with power circuit control apparatus for controlling the electric power supplied to a primary load and an auxiliary load. The power circuit control apparatus includes rectifying means for converting a-c electric power from an a-c source to d-c electric power and for supplying at a first side thereof d-c electric power to a first output terminal. The other side of the output circuit of the rectifier is coupled to a common bus. The apparatus also includes means for receiving a d-c battery source and supplying at a first side thereof d-c electric power to a second output terminal, the other side of the output circuit of the battery being coupled to the common bus. A two position mechanical switch has a third output terminal and first and second input terminals coupled to the first and second output terminals, respectively. The mechanical switch connects the third output terminal to the first input terminal in the first switch position and the third output terminal to the second input terminal in the second switch position. A solid state switch having a pair of power terminals and a control terminal has its control terminal connected to the first output terminal. A first load circuit comprising at least the primary load is coupled to the third output terminal at one end thereof and the common bus at the other end thereof such that the primary load is energized whenever operating voltage is supplied to the third output terminal. A second load circuit comprising at least a series connection of the auxiliary load and the power terminals of the solid state switch is coupled to the third output terminal at one end thereof and the common bus at the other end thereof. The solid state switch is conductive only when operating voltage is applied to the second load circuit from the third output terminal and control voltage is simultaneously applied to the control terminal from the first output terminal. In this manner, the auxiliary load is energized only when the rectifying means is supplying d-c electric power from an a-c source.

By a further aspect of the invention, voltage regulating means is coupled to at least the second load circuit for regulating the voltage applied to the auxiliary load. An ON/OFF switch is provided between the third output terminal and each of the first and second load circuits for selectively permitting and preventing the supply of operating voltage thereto from the third output terminal. By a still further aspect of the invention, means is provided for receiving an a-c power cord and mechanically switching the mechanical switch to the first of its two positions whenever an a-c power cord is connected to the product and for mechanically switching the mechanical switch to the second of its positions whenever an a-c power cord in not connected to the product. The solid state switch comprises an NPN transistor having its collector coupled to the third output terminal, its emitter coupled to the auxiliary load, and its base comprising the control terminal coupled to the first output terminal. In one form, the voltage regulating means is coupled across the base-emitter junction and the auxiliary load such that the voltage across the auxiliary load is maintained substantially constant at a level established by the voltage output of the voltage regulating means less the base-emitter junction drop of the transistor. In another form, the auxiliary load is connected in series with the voltage regulating means such that the voltage across the auxiliary load is maintained substantially constant at a level established by the voltage output of the voltage regulating means less the transistor drop across the collector and emitter terminals.

BRIEF DESCRIPTION OF THE DRAWINGS

While the novel features of the invention are set forth with particularity in the appended claims, the invention, both as to organization and content, will be better understood and appreciated, along with other objects and features thereof, from the following description taken in connection with the drawings, in which:

FIG. 4 is a block diagram similar to FIG. 3 illustrating another preferred embodiment of the present invention.

DESCRIPTION OF PREFERRED EMBODIMENTS

Figure 1:
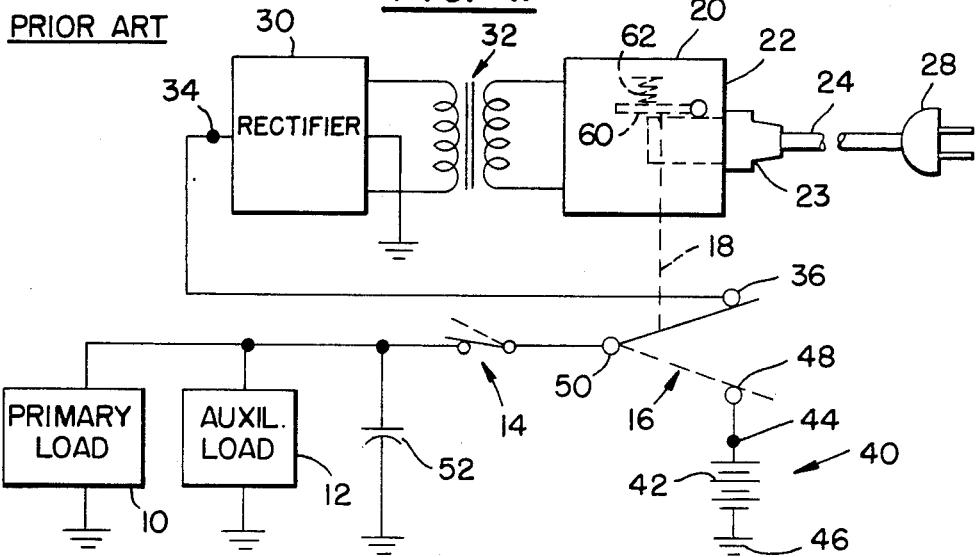
FIG. 1 is a block diagram of a typical prior art portable audio product that has both primary and auxiliary loads and is selectively powered from either an a-c source or a d-c source.

A typical prior art portable audio product having both a primary load 10 and an auxiliary load 12 is illustrated by FIG. 1. The product of FIG. 1 also includes a manually operated single pole ON/OFF switch 14 and an automatically operated single pole switch 16 mechanically coupled by suitable actuating means 18 to a line connection apparatus 20 including a jack 22 for receiving one end 23 of an a-c line cord 24. The other end of the line cord 24 terminates in a plug 28 which may selectively be plugged into an outlet such as a wall receptacle from a source of a-c potential. A rectifier 30 is coupled to the line connector 20 through a transformer 32, and the output terminal 34 of the rectifier 30 is connected to a first input terminal 36 of the mechanical switch 16. The product of FIG. 1 further includes means 40 for receiving a d-c battery 42 between an output terminal 44 and a common bus or ground 46. The output terminal 44 is connected to a second input terminal 48 of the mechanical switch 16. The switch 16 has an output terminal 50 connected in series through the ON/OFF switch 14 to both the primary load 10 and the auxiliary load 12. A capacitor 52 is provided for smoothing out the d-c voltage supplied to both the primary load 10 and the auxiliary load 12.

Figure 2:
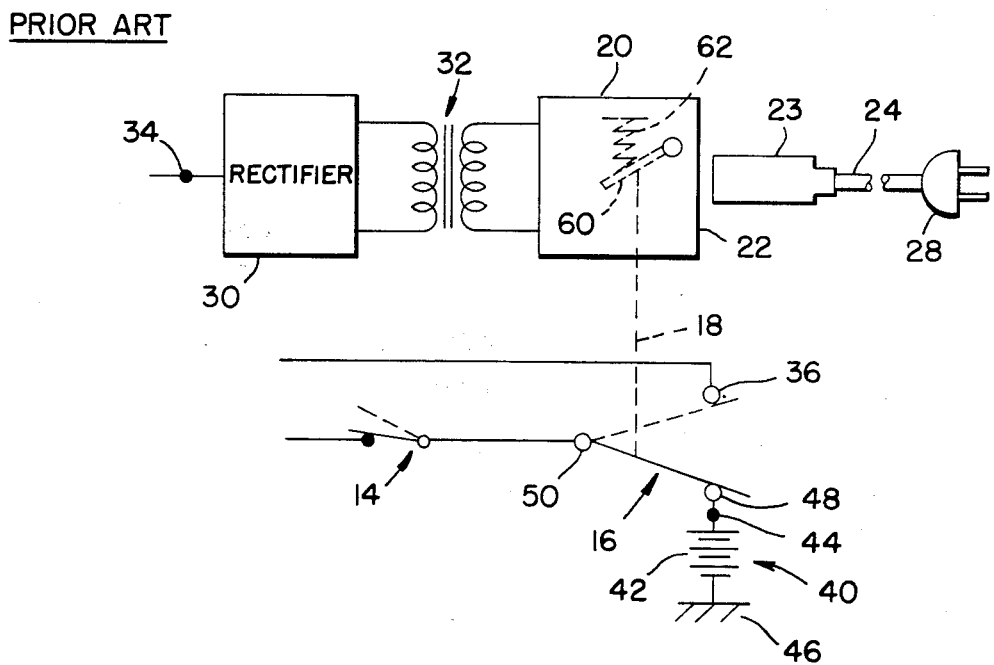
FIG. 2 is a view of a portion of the apparatus of FIG. 1 showing the changed status when the a-c power cord is removed.

As indicated previously, the switches 14 and 16 are single pole switches each having a first operative position illustrated by solid lines in FIG. 1 and a second operative position illustrated by broken lines in FIG. 1. More particularly, the ON/OFF switch 14 is manually operated by the consumer. In its first, or ON, position, the switch 14 is closed, and d-c electric power may be supplied therethrough from the output terminal 50 of the switch 16 to both loads. In its second, or OFF, position, the switch 14 is open, and d-c electric power cannot be supplied therethrough to the loads. The mechanical connection 18 between the single pole of the switch 16 and the line connector 20 is such that the switch 16 is in its first position connecting the first input terminal 36 and the output terminal 50 whenever the line cord 24 is plugged into the jack 22 and such that the switch 16 is in its second position connecting the second input terminal 48 and the output terminal whenever the line cord 24 is not plugged into the jack 22. This latter condition is illustrated by FIG. 2; otherwise, FIGS. 1 and 2 are identical. The connection 18 may take various forms in practice. In the illustrated form, the connection 18 is merely a mechanical link coupled to a movable member 60 loaded by a compression spring 62. When the connector 23 of the line cord 24 is inserted into the jack 22, it forces the member 60 and thus the pole of the switch 16 to the position illustrated by FIG. 1. When the line cord 24 is removed, the compression spring 62 forces the member 60 and the pole of the switch 16 to the position illustrated by FIG. 2. This mechanical operating scheme is intended to be illustrative only; many other arrangements will readily occur to those skilled in the art.

The mode of operation of the prior art product of FIG. 1 will now be described. When the connector 23 is inserted into the jack 22, the switch 16 is positioned as shown by FIG. 1. If the plug 28 is attached to a source of a-c potential and the switch 14 is manually placed in its ON position, d-c electric power will be supplied from the output terminal 34 of the rectifier 30 to both the primary load 10 and the auxiliary load 12 through the switches 14 and 16. Power to both loads may be conveniently controlled by means of the ON/OFF switch 14 when the connector 23 is received in the jack 22. If the connector 23 is removed from the jack 22, the pole of the switch 16 will move to its second position (solid line in FIG. 2 and broken line in FIG. 1), and d-c electric power will be supplied from the battery 42 to both the primary load 10 and the auxiliary load 12 through the switches 14 and 16. As indicated previously, this mode of operation may be unsatisfactory because of the large current drain it places on the battery.

Figure 3:
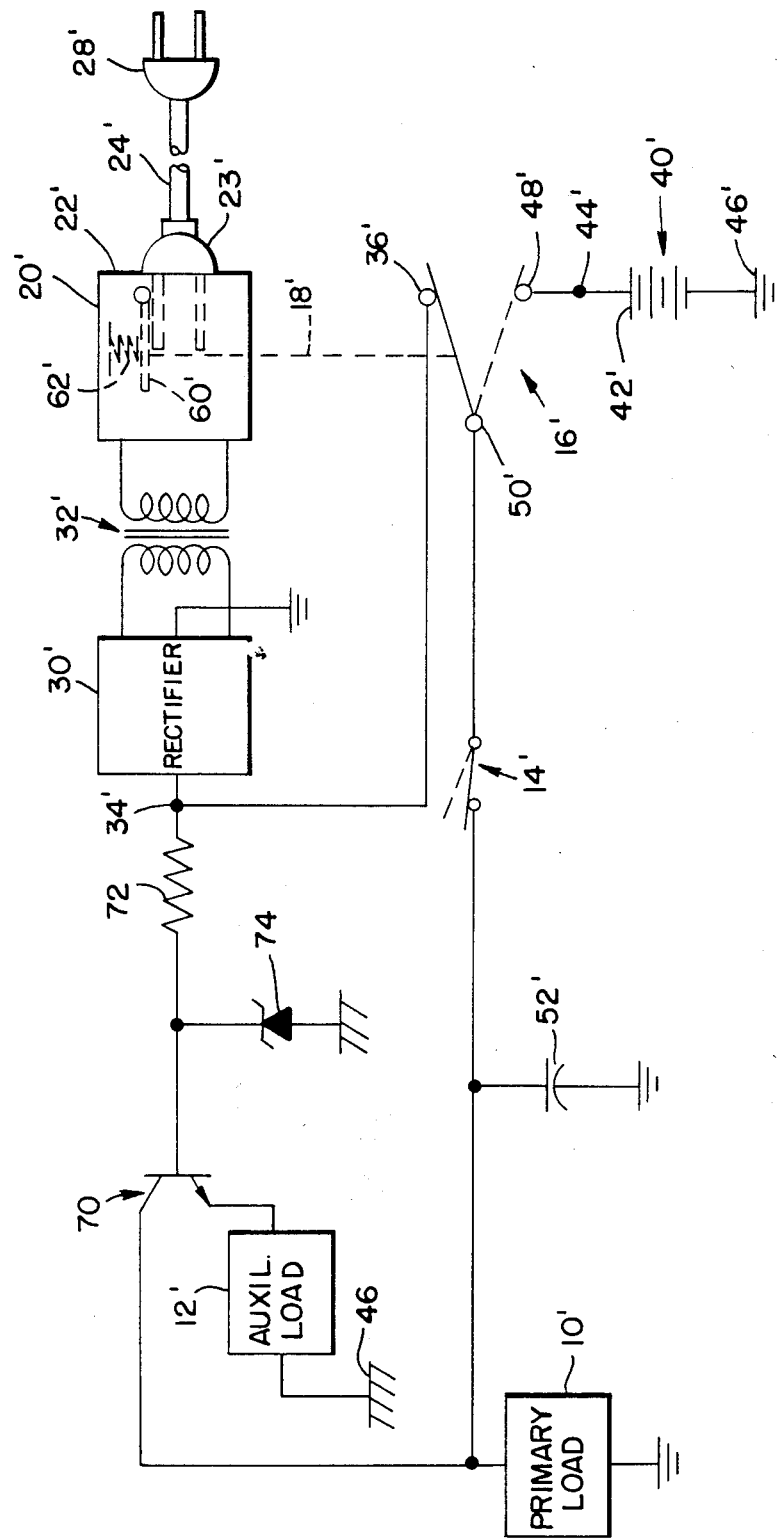
FIG. 3 is block diagram similar to FIG. 1 illustrating one preferred embodiment of the present invention.

Referring now to FIG. 3, a first preferred embodiment of the present invention is illustrated. In many respects, the product illustrated by FIG. 3 is similar to that of FIG. 1, and like components are identified by primed numerals. The primary load 10' is coupled to the output terminal 50' of the switch 16' through the switch 14' in a manner identical to that shown by FIG. 1. The auxiliary load 12' is connected in series with the collector and emitter terminals of an NPN transistor 70 to form a load circuit coupled between the switch 14' and the common bus 46'. The base or control terminal of the transistor 70 is connected through a base resistor 72 to the output terminal 34' of the rectifier 30'. A zener diode 74 is coupled between the base terminal of the transistor 70 and the common bus 46'.

When the audio product is powered from an a-c source with the switches 14 and 16 positioned as illustrated by FIG. 3, the base of the transistor 70 is energized as a consequence of its connection to the output terminal 34' of the rectifier 30' through the base resistor 72. The value of the base resistor 72 is selected to provide sufficient zener current and to turn on the transistor 70. The output voltage of the rectifier 30' is also supplied to both the primary load 10' and the load circuit including the auxiliary load 12' through the switches 14' and 16'. As a result, the transistor 70 is turned fully on, and the auxiliary load 12' is energized. Due to the voltage regulation provided by the zener diode 74, the voltage across the auxiliary load 12' is maintained substantially constant at a level established by the voltage across the zener diode 74 less the base-emitter junction drop of the transistor 70. If the manual switch 14' is subsequently moved to its OFF position as illustrated by a broken line in FIG. 3, current will no longer flow to the primary load 10' and the collector terminal of the transistor 70. As a result, the primary load 10' will be deenergized and the auxiliary load 12' will be substantially deenergized. A very small current will flow from the rectifier 30' through the base resistor 72 and the base-emitter junction to the auxiliary load 12' and ground. The relative values of the rectifier voltage, the base resistor 72 and the auxiliary load 12' are selected such that a current in the order of a very few milliamperes flows from the rectifier 30' to the auxiliary load. This current neither constitutes an appreciable power drain from the a-c source nor results in appreciable energization of the auxiliary load 12'.

If the power cord 24' is removed in the manner of FIG. 2, the pole of the switch 16' is moved to the position illustrated by a broken line in FIG. 3. When the manual ON/OFF switch 14' is thereafter moved to its ON position, the primary load 10' will be powered from the battery 42' through the switches 14' and 16'. Since there is no voltage output from the rectifier 30' at its output terminal 34', however, no current will flow through the base-emitter junction of the transistor 70, and as a consequence the transistor 70 will be non-conductive. The auxiliary load 12' is thus not energized when the product is powered from the battery 42'. This result is attained without using multiple pole switches in place of the single pole switches 14 and 16 (FIGS. 1 and 2) of the prior art products.

A second preferred embodiment of the present invention is illustrated by FIG. 4. This embodiment is similar to the one of FIG. 3, like components being identified by double primed numerals. In this embodiment, a voltage regulator 80 of conventional form is provided in the circuit between the output terminal 50" of the switch 16" and the primary load 10". The voltage regulator 80 assures that the primary load 10" is supplied with a substantially constant voltage during operation from either an a-c source or a d-c source. The output of the voltage regulator 80 is also connected to a load circuit comprising the auxiliary load 12" in series with the collector and emitter terminals of the transistor 70", the emitter terminal being connected to the common bus 46". A capacitor 82 is provided across the base and emitter junctions of the transistor 70" to smooth out the d-c voltage supplied thereto. In this embodiment, when the power cord 24" is connected and the switches 14" and 16" are positioned as illustrated by solid lines, the transistor 70" will be turned on by the current supplied through the base resistor 72". The auxiliary load 12" is therefore energized by a substantially constant voltage at a level established by the voltage output of the the voltage regulator 80 less the transistor drop across the collector and emitter terminals. If the switch 14" is switched to its OFF position, current will not flow to the primary and auxiliary loads. Slight current will continue to flow through the base-emitter junction of the transistor 70", but its level will not be appreciable because of the relatively high value of the base resistor 72".

If the power cord 24" is removed, the switch 16" will shift to the position illustrated by broken lines in FIG. 4, and d-c electric power from the battery 42" will be supplied to the primary load 10" through the switches 14" and 16". Since there is no output voltage from the rectifier 30", however, the transistor 70" will not conduct, and no current will be supplied to the auxiliary load 12".

From the foregoing, it will be seen that the present invention provides a consumer electronics product in which both the primary and auxiliary loads are energized in the a-c operating mode, but only the auxiliary load is energized in the d-c operating mode. This result is achieved in a manner that does not require the use of multiple pole switching devices or other costly devices or manufacturing procedures.

While the invention has been particularly shown and described with reference to preferred embodiments thereof, it will be understood by those skilled in the art that various changes in form, details, and application may be made therein without departing from the spirit and scope of the invention. Accordingly, it is intended that all such modifications and changes be included within the spirit and scope of the appended claims.

What is claimed as new and is desired to secure by Letters Patent of the United States is:

1. In a consumer electronics product adapted for energization from either a source of a-c potential or a source of d-c potential and having a primary load and an auxiliary load, power circuit control apparatus comprising:

rectifying means for converting electric power from an a-c source to d-c electric power and supplying d-c electric power to a first output terminal, means for receiving a d-c battery source and supplying d-c electric power to a second output terminal, a two position mechanical switch having a third output terminal, a first input terminal coupled to said first output terminal, a second input terminal coupled to said second output terminal, and means for connecting said third output terminal to said first input terminal in the first of said two positions and for connecting said third output terminal to said second input terminal in the second of said two positions, a solid state switch having a pair of power terminals and a control terminal, said control terminal coupled to said first output terminal, a first load circuit comprising at least the primary load coupled to said third output terminal for receiving electric power therefrom, the primary load being energized whenever operating voltage is supplied to said third output terminal, a second load circuit coupled to said third output terminal for receiving electric power therefrom, said second load circuit comprising at least a series connection of the auxiliary load and the power terminals of said solid state switch, said solid state switch being conductive only when operating voltage is applied to said second load circuit from said third output terminal and control voltage is simultaneously applied to said control terminal from said first output terminal, whereby the auxiliary load is energized only when said rectifying means is supplying d-c electric power from an a-c source.

2. Power circuit control apparatus as defined by claim 1 further comprising voltage regulating means coupled to at least said second load circuit for regulating the voltage applied to the auxiliary load.

3. Power circuit control apparatus as defined by claim 1 further comprising a third circuit coupling said third output terminal and each of said first and second load circuits, said third circuit comprising at least voltage regulating means for regulating the voltage applied to both the primary load and the auxiliary load.

4. Power circuit control apparatus as defined by claim 1 further comprising an ON/OFF switch coupling said third output terminal and each of said first and second load circuits for selectively permitting and preventing the supply of operating voltage thereto from said third output terminal.

5. Power circuit control apparatus as defined by claim 1 wherein the consumer electronics product includes means for receiving an a-c power cord and mechanically switching said mechanical switch to the first of said two positions whenever an a-c power cord is connected thereto and mechanically switching said mechanical switch to the second of said two positions whenever an a-c power cord is not connected thereto.

6. Power circuit control apparatus as defined by claim 5 further comprising an ON/OFF switch coupling said third output terminal and each of said first and second load circuits for selectively permitting and preventing the supply of operating voltage thereto from said third output terminal.

7. Power circuit control apparatus as defined by claim 1 in which said solid state switch comprises an NPN transistor having its emitter coupled to the auxiliary load, and its base comprising the control terminal coupled to said first output terminal, said power circuit control apparatus further comprising voltage regulating means across the base-emitter junction of said transistor and the auxiliary load, whereby the voltage across the auxiliary load is maintained substantially constant at a level established by the voltage output of said voltage regulating means less the base-emitter junction drop of said transistor.

8. Power circuit control apparatus as defined by claim 7 in which said voltage regulating means is a zener diode.

9. Power circuit control apparatus as defined by claim 8 further comprising an ON/OFF switch coupling said third output terminal and each of said first and second load circuits for selectively permitting and preventing the supply of operating voltage thereto from said third output terminal.

10. Power circuit control apparatus as defined by claim 8 wherein the consumer electronics product includes means for receiving an a-c power cord and mechanically switching said mechanical switch to the first of said two positions whenever an a-c power cord is connected thereto and mechanically switching said mechanical switch to the second of said two positions whenever an a-c power cord is not connected thereto.

11. Power circuit control apparatus as defined by claim 10 further comprising an ON/OFF switch coupling said third output terminal and each of said first and second load circuits for selectively permitting and preventing the supply of operating voltage thereto from said third output terminal.

12. Power circuit control apparatus as defined by claim 3 in which the auxiliary load is connected directly to said voltage regulating means and said solid state switch comprises an NPN transistor having its collector coupled to the auxiliary load and its base comprising the control terminal coupled to said first output terminal, whereby the voltage across the auxiliary load is maintained substantially constant at a level established by the voltage output of said voltage regulating means less the transistor drop across the collector and emitter terminals.

13. Power circuit control apparatus as defined by claim 12 further comprising an ON/OFF switch coupling said third output terminal and each of said first and second load circuits for selectively permitting and preventing the supply of operating voltage thereto from said third output terminal.

14. Power circuit control apparatus as defined by claim 12 wherein the consumer electronics product includes means for receiving an a-c power cord and mechanically switching said mechanical switch to the first of said two positions whenever an a-c power cord is connected thereto and mechanically switching said mechanical switch to the second of said two positions whenever an a-c power cord is not connected thereto.

15. Power circuit control apparatus as defined by claim 14 further comprising an ON/OFF switch coupling said third output terminal and each of said first and second load circuits for selectively permitting and preventing the supply of operating voltage thereto from said third output terminal.

* * * * *